(12) United States Patent
Khan et al.

(10) Patent No.: US 11,271,971 B1
(45) Date of Patent: Mar. 8, 2022

(54) DEVICE FOR FACILITATING MANAGING CYBER SECURITY HEALTH OF A CONNECTED AND AUTONOMOUS VEHICLE (CAV)

(71) Applicant: King Saud University, Riyadh (SA)

(72) Inventors: Muhammad Khurram Khan, Riyadh (SA); Wazir Zada Khan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 17/206,487

(22) Filed: Mar. 19, 2021

(51) Int. Cl.
| | | |
|---|---|---|
| *H04L 29/06* | (2006.01) | |
| *G06F 8/65* | (2018.01) | |
| *G06F 21/31* | (2013.01) | |
| *B60W 50/06* | (2006.01) | |
| *B60W 50/02* | (2012.01) | |
| *B60W 60/00* | (2020.01) | |
| *H04L 67/12* | (2022.01) | |

(52) U.S. Cl.
CPC ......... *H04L 63/20* (2013.01); *B60W 50/0205* (2013.01); *B60W 50/06* (2013.01); *B60W 60/00* (2020.02); *G06F 8/65* (2013.01); *G06F 21/31* (2013.01); *H04L 67/12* (2013.01)

(58) Field of Classification Search
CPC ........ H04L 63/20; H04L 67/12; B60W 60/00; B60W 50/0205; B60W 50/06; G06F 8/65; G06F 21/31
See application file for complete search history.

(56) References Cited

U.S. PATENT DOCUMENTS

| | | | |
|---|---|---|---|
| 7,366,589 B2* | 4/2008 | Habermas | ............. B60L 3/0023 701/1 |
| 7,797,737 B2 | 9/2010 | Eibach et al. | |
| 8,978,160 B2* | 3/2015 | Alrabady | .................. G06F 8/65 726/30 |
| 9,038,132 B2 | 5/2015 | Harata et al. | |
| 9,401,923 B2 | 7/2016 | Valasek et al. | |
| 9,531,750 B2 | 12/2016 | Lawlis | |
| 9,616,828 B2 | 4/2017 | Ben Noon et al. | |

(Continued)

OTHER PUBLICATIONS

Howden et al. (The Security Aspects of Automotive Over-the-Air Updates, International Journal of Cyber Warfare and Terrorism vol. 10 • Issue 2 • Apr.-Jun. 2020, pp. 64-81) (Year: 2020).*

*Primary Examiner* — Oleg Korsak

(57) ABSTRACT

Disclosed herein is a device for facilitating managing cyber security health of a connected and autonomous vehicle (CAV). Accordingly, the device may include a communication interface configured for transmitting a request for updating an electronic control unit (ECU) to a connected and autonomous vehicle (CAV) manufacturer server and receiving a security update and a security patch for the ECU from the CAV manufacturer server. Further, the device may include a processing device communicatively coupled with the communication interface. Further, the processing device may be configured for applying the security update and the security patch to the ECU for updating the ECU, determining an update status for each ECU, and generating a cyber security health status report of the CAV. Further, the device may include a storage device communicatively coupled with the processing device. Further, the storage device may be configured for storing the cyber security health status report.

19 Claims, 15 Drawing Sheets

(56) References Cited

U.S. PATENT DOCUMENTS

| | | | |
|---|---|---|---|
| 9,639,344 B2* | 5/2017 | Rockwell | G06F 8/65 |
| 9,661,006 B2 | 5/2017 | Kantor et al. | |
| 9,672,025 B2* | 6/2017 | Martin | G06F 8/654 |
| 9,686,294 B2 | 6/2017 | Kantor et al. | |
| 9,772,839 B2* | 9/2017 | Hong | H04M 1/72406 |
| 9,836,300 B2* | 12/2017 | Moeller | H04L 67/34 |
| 9,916,151 B2* | 3/2018 | Ye | H04L 9/3247 |
| 10,042,635 B2* | 8/2018 | Moeller | H04L 67/34 |
| 10,057,286 B2* | 8/2018 | Ben David | H04L 63/20 |
| 10,165,084 B2* | 12/2018 | Moeller | H04L 67/12 |
| 10,209,981 B2* | 2/2019 | Hirshberg | G06F 11/1433 |
| 10,261,777 B2* | 4/2019 | Fox | B60W 50/0205 |
| 10,318,269 B2* | 6/2019 | Tiles | G06F 8/65 |
| 10,416,985 B2* | 9/2019 | Madrid | H04L 67/34 |
| 10,419,408 B1 | 9/2019 | Herzberg et al. | |
| 10,514,900 B2* | 12/2019 | Teraoka | G06F 11/00 |
| 10,530,793 B2 | 1/2020 | Galula et al. | |
| 10,592,231 B2* | 3/2020 | Sakurai | G06F 8/65 |
| 10,623,205 B2 | 4/2020 | Tsurumi et al. | |
| 10,678,530 B2* | 6/2020 | Sangameswaran | B60L 58/13 |
| 10,703,383 B1* | 7/2020 | Chan | B60W 50/0205 |
| 10,732,958 B2* | 8/2020 | Kojima | H04L 12/40 |
| 10,782,955 B2* | 9/2020 | Madrid | G06F 8/65 |
| 10,834,206 B2* | 11/2020 | Acharya | G06F 8/658 |
| 10,873,600 B2 | 12/2020 | Nakano et al. | |
| 10,897,469 B2 | 1/2021 | Hirshberg et al. | |
| 10,977,875 B2* | 4/2021 | Miller | G07C 5/008 |
| 10,988,091 B2* | 4/2021 | Sangameswaran | H01H 47/00 |
| 11,005,880 B2* | 5/2021 | Dyakin | H04W 4/50 |
| 11,048,493 B2* | 6/2021 | Mine | G06F 11/36 |
| 11,146,401 B2* | 10/2021 | Miller | H04L 9/006 |
| 11,163,549 B2* | 11/2021 | Sakurai | H04W 4/44 |
| 2009/0138942 A1* | 5/2009 | Alrabady | H04W 4/44 726/4 |
| 2011/0320089 A1* | 12/2011 | Lewis | H04W 12/041 701/29.6 |
| 2012/0110654 A1* | 5/2012 | Alrabady | H04L 9/3263 726/10 |
| 2014/0059530 A1* | 2/2014 | Banavalikar | G06F 9/4406 717/170 |
| 2016/0196131 A1* | 7/2016 | Searle | H04L 29/06 717/173 |
| 2016/0196132 A1* | 7/2016 | Searle | H04L 41/082 717/173 |
| 2016/0202966 A1* | 7/2016 | Vangelov | H04L 67/12 717/172 |
| 2016/0291940 A1* | 10/2016 | Searle | H04L 41/082 |
| 2016/0291959 A1* | 10/2016 | Searle | H04L 63/10 |
| 2016/0294605 A1* | 10/2016 | Searle | H04L 41/082 |
| 2016/0294614 A1* | 10/2016 | Searle | H04L 67/34 |
| 2017/0060559 A1* | 3/2017 | Ye | G06F 21/572 |
| 2019/0220265 A1* | 7/2019 | Willis | H04W 76/10 |
| 2019/0222569 A1* | 7/2019 | Willis | H04W 12/069 |
| 2019/0265965 A1* | 8/2019 | Acharya | H04L 63/0823 |
| 2019/0324858 A1* | 10/2019 | Sarkar | G06F 8/658 |
| 2019/0391800 A1* | 12/2019 | Lin | H04L 67/34 |
| 2020/0174778 A1* | 6/2020 | David | G06F 21/57 |
| 2020/0174779 A1* | 6/2020 | David | H04L 67/12 |
| 2020/0371773 A1* | 11/2020 | Kato | G01C 21/3667 |
| 2020/0371774 A1* | 11/2020 | Kato | G06K 9/00832 |

* cited by examiner

DEVICE FOR FACILITATING MANAGING CYBER SECURITY HEALTH OF A CONNECTED AND AUTONOMOUS VEHICLE (CAV)

FIELD OF THE INVENTION

Generally, the present disclosure relates to the field of data processing. More specifically, the present disclosure relates to a device for facilitating managing cyber security health of a connected and autonomous vehicle (CAV).

BACKGROUND OF THE INVENTION

The dramatically changing and evolving automobile industry has led to the development of Connected and Autonomous Vehicles (CAVs), which offer advanced functionalities, features, and services for the ease and comfort of their consumers. The CAVs offer self-driving functions and are capable of driving themselves with and without human intervention by leveraging a number of different data sources and assessing the environment to control the vehicle operations. Further, a foremost benefit of autonomous cars may include improved safety of the driver. It can arguably make driving a safer proposition and provide safe driving by eliminating the likelihood of human errors that are caused by a driver's distraction, fatigue, drowsiness, aggressiveness, carelessness, and disabilities, etc. According to the WHO, 1.35 million people lose their precious lives each year due to traffic accidents. Further, the CAVs can cost-effectively increase citizen's mobility by providing ease of use and convenience for elderly people and young adults without a driver's license and especially for those people who are unable to drive a car due to some disability/medical conditions or intoxication or the people who cannot afford to own a car. Further, carpooling becomes more efficient by effective utilization of CAVs resources. In traditional carpooling, there are time and money constraints whereas when autonomous cars are used for carpooling services, fuel efficiency is improved by selecting the best routes, and the driver cost considered by the commuters is eliminated by saving time and money with hassle-free driving of commuters. CAVs can also improve traffic conditions by increasing occupancy per vehicle, and decreasing the number of vehicles on the road, and adhering to the traffic laws more accurately.

Further, there are significant benefits of CAVs to its consumers and to society at large. People have positive attitudes towards CAVs, but they remain uncertain about some complex factors that determine their willingness and speed of acceptance. For example, a recent survey showed that nearly 75 of Americans fear riding in a self-driving car. Consumers of CAVs are afraid because of the security risks and variety of potential privacy implications that are associated with them. CAVs have an Electronic Control Unit (ECU) which are brains having the capabilities of modern computers with high processing power and extensive memory. ECUs in a CAV collect data from a number of sensors (LiDAR, Radar, Image, ultrasound, GPS, etc.) and process multiple data streams with precision and reliability. However, existing techniques for facilitating managing cybersecurity health of a connected and autonomous vehicle (CAV) are deficient with regard to several aspects. For instance, current technologies require regular firmware security patches and updates and if they are not updated periodically, they pose a life-threatening risk for the consumers of the CAVs since several successful cyber-attacks including those on security keys used by the ECUs, tire pressure monitoring systems (TPMSs), wireless key fobs and so on.

Moreover, unawareness of consumers about the security status of their privately owned or shared CAVs can create under or over-trust issues creating an obstacle in its widespread adoption. The connectivity of the CAVs to the outside world results in the opening of a new attack surface, allowing the experienced hackers to access the vehicle's electronic components in a very short time. Sensitive information about the consumer's current and future location i.e., a log of places he visited and will visit in the future can be compromised. Even more, some new levels of hacking could allow hackers to target vehicles and use these vehicles as weapons for malicious purposes. In 2015, a pertinent example occurred when two hackers seized control over a Jeep Cherokee (it was Internet-connected and driving at a speed of 70 mph) and stalled the vehicle on the highway by controlling the vehicle's car radio, ventilation system, braking, and transmission system.

Therefore, there is a need for improved devices for facilitating managing cyber security health of a connected and autonomous vehicle (CAV) that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a device for facilitating managing cyber security health of a connected and autonomous vehicle (CAV), in accordance with some embodiments. Accordingly, the device may include a communication interface configured for transmitting a request for updating at least one electronic control unit (ECU) of a plurality of electronic control units (ECUs) associated with the CAV to a connected and autonomous vehicle (CAV) manufacturer server. Further, the communication interface may be configured for receiving at least one of a security update and a security patch for the at least one ECU from the CAV manufacturer server based on the transmitting of the request. Further, the device may include a processing device communicatively coupled with the communication interface. Further, the processing device may be configured for applying at least one of the security update and the security patch to the at least one ECU for updating the at least one ECU based on the receiving. Further, the processing device may be configured for determining an update status for each ECU of the plurality of ECUs based on the applying. Further, the processing device may be configured for generating a cyber security health status report of the CAV based on the determining. Further, the device may include a storage device communicatively coupled with the processing device. Further, the storage device may be configured for storing the cyber security health status report.

Further disclosed herein is a device for facilitating managing cyber security health of a connected and autonomous vehicle (CAV), in accordance with some embodiments. Accordingly, the device may include a communication interface configured for transmitting a request for updating at least one electronic control unit (ECU) of a plurality of electronic control units (ECUs) associated with the CAV to a connected and autonomous vehicle (CAV) manufacturer server. Further, the communication interface may be configured for receiving at least one of a security update and a security patch for the at least one ECU from the CAV manufacturer server based on the transmitting of the request. Further, the communication interface may be configured for receiving a report request from at least one input device. Further, the report request may include at least one user identifier associated with at least one user. Further, the communication interface may be configured for transmitting a cyber security health status report to at least one output device. Further, the at least one output device may be configured for presenting the cyber security health status report. Further, the device may include a processing device communicatively coupled with the communication interface. Further, the processing device may be configured for applying at least one of the security update and the security patch to the at least one ECU for updating the at least one ECU based on the receiving. Further, the processing device may be configured for determining an update status for each ECU of the plurality of ECUs based on the applying. Further, the processing device may be configured for generating the cyber security health status report of the CAV based on the determining. Further, the processing device may be configured for identifying the at least one user based on the at least one user identifier. Further, the processing device may be configured for authenticating the at least one user based on the identifying of the at least one user. Further, the transmitting of the cyber security health status report may be based on the authenticating. Further, the device may include a storage device communicatively coupled with the processing device. Further, the storage device may be configured for storing the cyber security health status report.

Further disclosed herein is a device for facilitating managing cyber security health of a connected and autonomous vehicle (CAV), in accordance with some embodiments. Accordingly, the device may include a communication interface configured for receiving an updating request for updating at least one electronic control unit (ECU) of a plurality of electronic control units (ECUs) associated with the CAV from at least one user device. Further, the updating request may include at least one user identifier associated with at least one user. Further, the updating request may include at least one electronic control unit (ECU) identifier associated with the at least one ECU. Further, the communication interface may be configured for transmitting a request for the updating of the at least one electronic control unit (ECU) of the plurality of electronic control units (ECUs) associated with the CAV to a connected and autonomous vehicle (CAV) manufacturer server. Further, the communication interface may be configured for receiving at least one of a security update and a security patch for the at least one ECU from the CAV manufacturer server based on the transmitting of the request. Further, the device may include a processing device communicatively coupled with the communication interface. Further, the processing device may be configured for identifying the at least one user based on the at least one user identifier. Further, the processing device may be configured for authenticating the at least one user based on the identifying of the at least one user. Further, the processing device may be configured for identifying the at least one ECU based on the at least one ECU identifier. Further, the processing device may be configured for generating the request for the updating of at least one ECU based on the identifying of the at least one ECU and the authenticating. Further, the transmitting of the request for the updating of the at least one ECU may be based on the generating of the request. Further, the processing device may be configured for applying at least one of the security update and the security patch to the at least one ECU for updating the at least one ECU based on the receiving and the authenticating. Further, the processing device may be configured for determining an update status for each ECU of the plurality of ECUs based on the applying. Further, the processing device may be configured for generating a cyber security health status report of the CAV based on the determining. Further, the device may include a storage device communicatively coupled with the processing device. Further, the storage device may be configured for storing the cyber security health status report.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
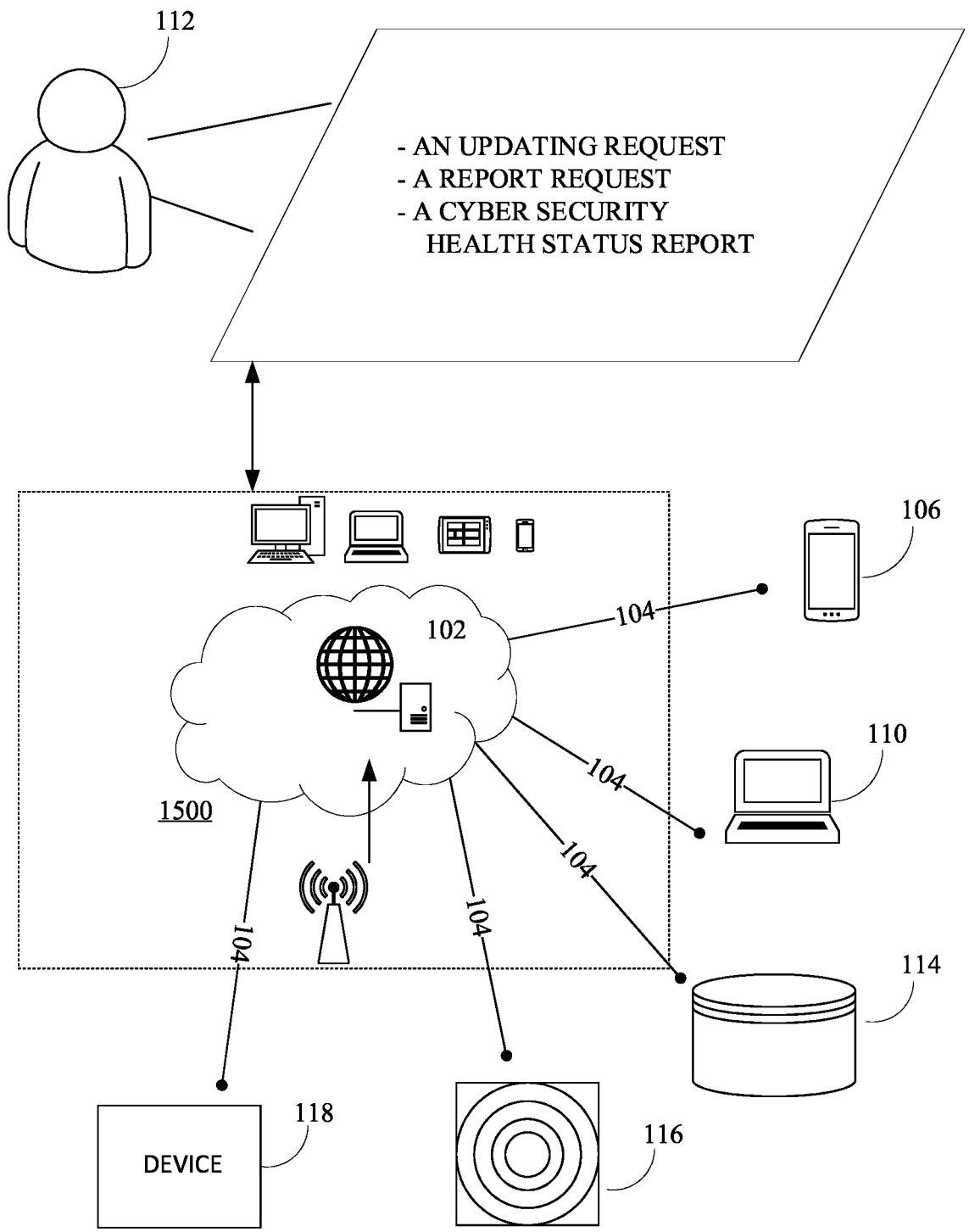
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a device for facilitating managing cyber security health of a connected and autonomous vehicle (CAV), embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes a device for facilitating managing cyber security health of a connected and autonomous vehicle (CAV). Further, the disclosed device may be configured for notifying and updating the cybersecurity health status of a Connected and Autonomous Vehicle (CAV). The disclosed device includes a unit called Cyber Security Box (CSBox), that may be installed in the CAV, configured to receive cybersecurity health status request from an owner or rider of a CAV over the network. Further, the CSBox works in bidirectional, from vehicle to manufacturer and manufacturer to vehicle to update or notify the cyber security health status of the vehicle. Further, if the vehicle owner wants to check the cyber security health status of the vehicle, the vehicle interacts with the CSBox through a mounted screen on a dashboard of the vehicle or a smartphone associated with the user. The CSBox receives or validates the identification of the requesting CAV and then sends a request to a CAV manufacturer server for newly released security updates and patches. Further, the CSBox collects information from all ECUs (Electronic Control Units) in the CAV and compares it with the received information about the latest updates and patches from the CAV manufacturer server and analyzes and compares them. The CSBox reveals which ECUs require updates and patches and then generates a cybersecurity health status report of the CAV by displaying it on the digital screen mounted on the vehicle's dashboard. Further, the cybersecurity health status report (or report) may include the prompts and alerts associated with the security updates, patches, and warnings. The report specifies the details about the ECUs software, hardware, and firmware security patches, which require further updates and downloads, and then installs the latest security updates in the CAV.

Further, the disclosed device may build consumer's trust and increase their awareness about the security status of their CAVs. Additionally, intelligent fleet management may be performed that may reduce traffic jams on the roads. Last but not least, the parking issues can be alleviated by using autonomous car parking facilities.

Further, the CSBox may be located in a connected and autonomous vehicle (CAV) and is configured to receive a cybersecurity health status request from the owner or rider of a CAV over the network. The CSBox validates the identification of a requesting CAV, checks and retrieves the security update records and generates a security health status report of that CAV. Further, the CSBox is coupled to a plurality of ECUs through in-vehicle networks (vehicle bus e.g., Automotive Ethernet, CAN, FlexRay, LIN, etc.). Further, the CSBox is also coupled with the digital screen mounted on the dashboard of the CAV. In accordance with some embodiments, the CSBox consists of two major modules called Data Aggregator and Data Analyzer. The data aggregator aggregates information from all the ECUs and forwards it to the Data Analyzer module. The data analyzer requests the CAV manufacturer server to check for available updates. Further, the data analyzer then analyzes and compares the information collected by the aggregator and information received from the CAV manufacturer server. The CSBox generates a security health status report about the requested AV by informing the consumer in the form of prompts related to firmware that are fully updated and alerts or warnings regarding the firmware, which require further updating on the digital screen mounted on the dashboard of the CAV or the smart mobile device. Moreover, the CSBox includes a monitoring and management application, that may keep the record of all installed security updates with timestamps and may also periodically request the CAV manufacturer server for any available recently released security updates and patches.

Further, in an embodiment, the disclosed device may be associated with a Connected and Autonomous Manufacturer (CAVM) server that receives a request from the CSBox to check for the available security updates and patches for different ECUs. The CAVM server may provide services regarding the availability of software and hardware and firmware security updates of all models of different kinds of CAVs launched by the manufacturers.

Further, in an embodiment, the disclosed device may be communicatively with a smart mobile device configured to check cybersecurity health status of CAV. The smart mobile device may send a health status request (or request) to the CSBox of the CAV for the complete report regarding the cybersecurity health status of the CAV. The request may be generated by the owner of a CAV or a rider who is hiring any kind of CAV for traveling purposes.

Referring now to figures, FIG. 1 is an illustration of an online platform 100 consistent with various embodiments of the present disclosure. By way of non-limiting example, the online platform 100 to facilitate managing cybersecurity health of a connected and autonomous vehicle (CAV) may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116, and a device 118 (such as a device 200) over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1500.

Figure 2:
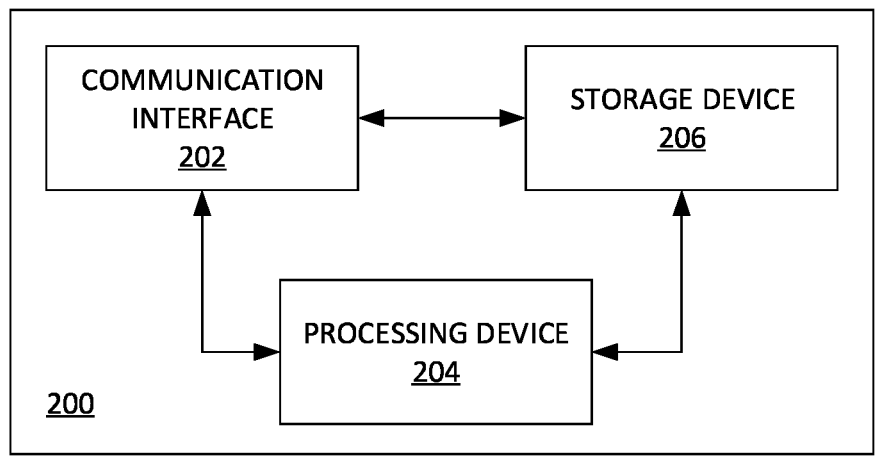
FIG. 2 is a block diagram of a device for facilitating managing cyber security health of a connected and autonomous vehicle (CAV), in accordance with some embodiments.
Figure 3:
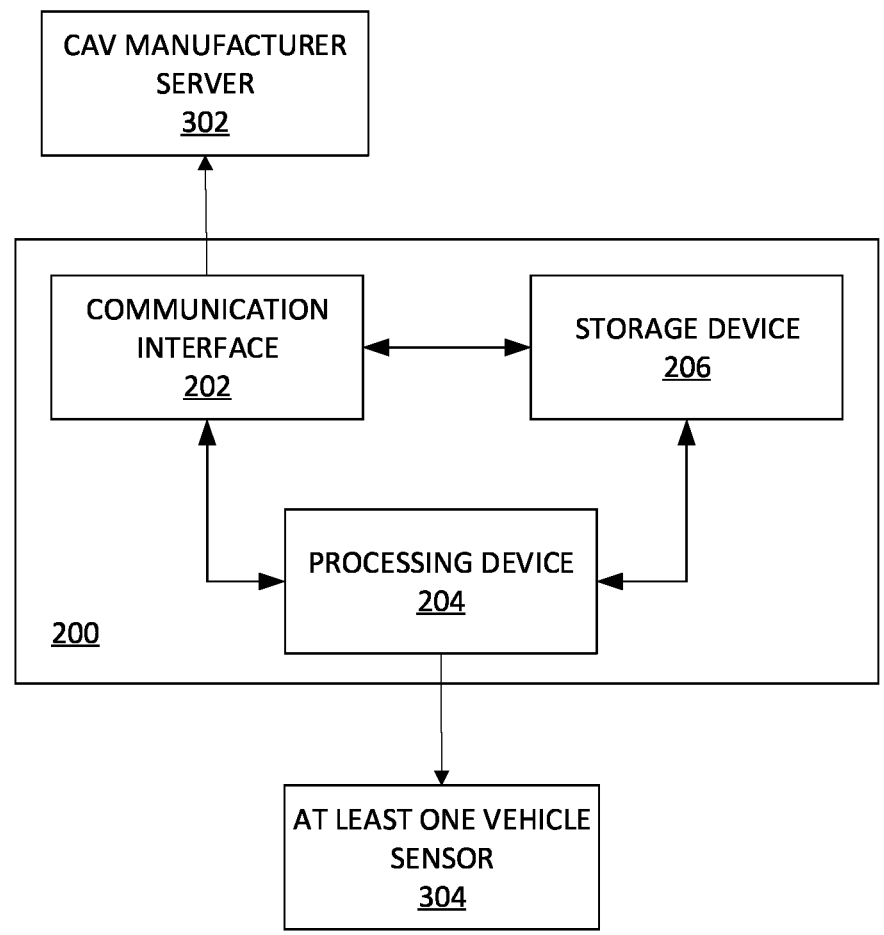
FIG. 3 is a block diagram of the device for facilitating managing the cyber security health of the connected and autonomous vehicle (CAV), in accordance with some embodiments.

FIG. 2 is a block diagram of a device 200 for facilitating managing cyber security health of a connected and autonomous vehicle (CAV), in accordance with some embodiments. Accordingly, the device 200 may include a communication interface 202 configured for transmitting a request for updating at least one electronic control unit (ECU) of a plurality of electronic control units (ECUs) associated with the CAV to a connected and autonomous vehicle (CAV) manufacturer server 302 (as shown in FIG. 3). Further, the communication interface 202 may be configured for receiving at least one of a security update and a security patch for the at least one ECU from the CAV manufacturer server 302 based on the transmitting of the request.

Further, the device 200 may include a processing device 204 communicatively coupled with the communication interface 202. Further, the processing device 204 may be configured for applying at least one of the security update and the security patch to the at least one ECU for updating the at least one ECU based on the receiving. Further, the processing device 204 may be configured for determining an update status for each ECU of the plurality of ECUs based on the applying. Further, the processing device 204 may be configured for generating a cyber security health status report of the CAV based on the determining.

Further, the device 200 may include a storage device 206 communicatively coupled with the processing device 204. Further, the storage device 206 may be configured for storing the cyber security health status report.

Further, in some embodiments, the processing device 204 may be configured for generating a record of an application of at least one of the security update and the security patch to the at least one ECU of the plurality of ECUs based on the applying. Further, the storage device 206 may be configured for storing the record.

Further, in some embodiments, the storage device 206 may be configured for retrieving a last record of an application of at least one of a last security update and a last security patch to the each ECU of the plurality of ECUs prior to the application of at least one of the security update and the security patch to the at least one ECU. Further, the processing device 204 may be configured for comparing the last record with the record based on the retrieving. Further, the determining of the update status of the each ECU may be based on the comparing.

Further, in some embodiments, the communication interface 202 may be configured for receiving update and patch information of at least one of an available security update and an available security patch associated with the at least one ECU from the CAV manufacturer server 302 based on the transmitting of the request. Further, the communication interface 202 may be configured for receiving at least one electronic control unit (ECU) information associated with the at least one ECU from the at least one ECU. Further, the processing device 204 may be configured for comparing the update and patch information with the at least one ECU information. Further, the determining of the update status of the at least one ECU may be based on the comparing.

Further, in some embodiments, the communication interface 202 may be configured for receiving a plurality of electronic control unit (ECU) information associated with the plurality of ECUs from the plurality of ECUs. Further, the processing device 204 may be configured for analyzing the plurality of ECU information. Further, the processing device 204 may be configured for identifying the at least one ECU requiring the updating based on the analyzing of the plurality of ECU information. Further, the processing device 204 may be configured for generating the request for the updating of the at least one ECU based on the identifying. Further, the transmitting of the request may be based on the generating of the request.

Further, in some embodiments, the processing device 204 may be configured for determining at least one of the security update and the security patch required by the at least one ECU based on the analyzing of the plurality of ECU information. Further, the generating of the request may be based on the determining of at least one of the security update and the security patch required by the at least one ECU.

Further, in some embodiments, the cyber security health status report may include at least one prompt associated with at least one first ECU of the plurality of ECUs. Further, the at least one prompt indicates a fully updated status of the update status. Further, the cyber security health status report may include at least one alert associated with at least one second ECU of the plurality of ECUs. Further, the at least one alert indicates an update requiring status of the update status.

Further, in some embodiments, the communication interface 202 may be configured for receiving a report request from at least one input device. Further, the report request may include at least one user identifier associated with at least one user. Further, the communication interface 202 may be configured for transmitting the cyber security health status report to at least one output device. Further, the at least one output device may be configured for presenting the cyber security health status report. Further, the processing device 204 may be configured for identifying the at least one user based on the at least one user identifier. Further, the processing device 204 may be configured for authenticating the at least one user based on the identifying of the at least one user. Further, the transmitting of the cyber security health status report may be based on the authenticating.

Further, in some embodiments, the communication interface 202 may be configured for receiving an updating request for the updating of the at least one ECU from at least one user device. Further, the updating request may include at least one user identifier associated with at least one user. Further, the processing device 204 may be configured for identifying the at least one user based on the at least one user identifier. Further, the processing device 204 may be configured for authenticating the at least one user based on the identifying of the at least one user. Further, the applying of at least one of the security update and the security patch to the at least one ECU may be based on the authenticating.

Further, in some embodiments, the updating request may include at least one electronic control unit (ECU) identifier associated with the at least one ECU. Further, the processing device 204 may be configured for identifying the at least one ECU based on the at least one ECU identifier. Further, the processing device 204 may be configured for generating the request for the updating of at least one ECU based on the identifying of the at least one ECU and the authenticating. Further, the transmitting of the request for the updating of the at least one ECU may be based on the generating of the request.

Figure 4:
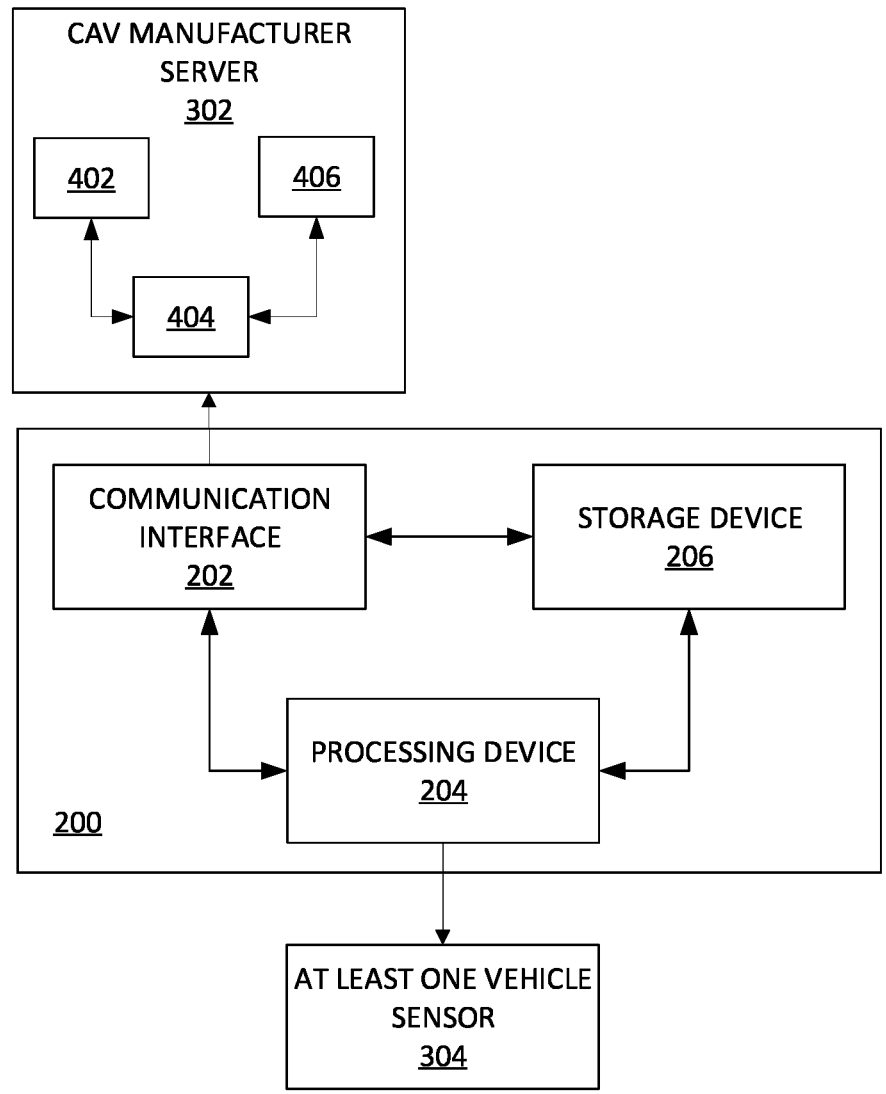
FIG. 4 is a block diagram of the device for facilitating managing the cyber security health of the connected and autonomous vehicle (CAV), in accordance with some embodiments.

Further, in some embodiments, the request may include at least one vehicle identifier associated with the CAV. Further, the CAV manufacturer server 302 may include a server communication device 402 (as shown in FIG. 4) configured for receiving the request from the communication interface 202 of the device 200. Further, the server communication device 402 may be configured for transmitting at least one of the security update and the security patch to the communication interface 202 of the CAV. Further, the CAV manufacturer server 302 may include a server processing device 404 (as shown in FIG. 4) communicatively coupled with the server communication device 402. Further, the server processing device 404 may be configured for identifying the CAV based on the at least one vehicle identifier. Further, the CAV manufacturer server 302 may include a server storage device 406 (as shown in FIG. 4) communicatively coupled with the server processing device 404. Further, the server storage device 406 may be configured for retrieving at least one of the security update and the security patch for the at least one ECU of the CAV based on the identifying of the CAV. Further, the transmitting of at least one of the security update and the security patch to the communication interface 202 of the CAV may be based on the retrieving.

Further, in some embodiments, the server processing device 404 may be configured for generating a server record of at least one of the security update and the security patch requested for the CAV based on the retrieving of at least one of the security update and the security patch. Further, the server storage device 406 may be configured for storing the server record.

Further, in some embodiments, the server storage device 406 may be configured for retrieving a last server record of at least one of a last security update and a last security patch requested for the CAV. Further, the server processing device 404 may be configured for comparing the last server record with the server record based on the retrieving of the last server record. Further, the determining of the update status of the each ECU of the plurality of ECUs may be based on the comparing.

Further, in some embodiments, the processing device 204 may be communicatively coupled with the plurality of ECUs. Further, the processing device 204 may be configured for communicating with the plurality of ECUs using at least one of a wired communication channel and a wireless communication channel. Further, the applying of at least one of the security update and the security patch to the at least one ECU may be based on the communicating.

Further, in some embodiments, the wired communication channel may include at least one in-vehicle network of the CAV. Further, the communicating with the plurality of ECUs may be based on the at least one in-vehicle network.

In further embodiments, the device 200 may include at least one vehicle sensor 304, as shown in FIG. 3, communicatively coupled with the processing device 204. Further, the at least one vehicle sensor 304 may be configured for generating at least one vehicle sensor data based on an operation of the CAV. Further, the processing device 204 may be configured for analyzing the at least one vehicle sensor data. Further, the processing device 204 may be configured for determining an abnormality associated with the operation of the CAV based on the analyzing of the at least one vehicle sensor data. Further, the processing device 204 may be configured for generating the request for the updating of the at least one ECU based on the determining of the abnormality. Further, the transmitting of the request may be based on the generating of the request.

FIG. 3 is a block diagram of the device 200 for facilitating managing the cyber security health of the connected and autonomous vehicle (CAV), in accordance with some embodiments.

FIG. 4 is a block diagram of the device 200 for facilitating managing the cyber security health of the connected and autonomous vehicle (CAV), in accordance with some embodiments.

Figure 5:
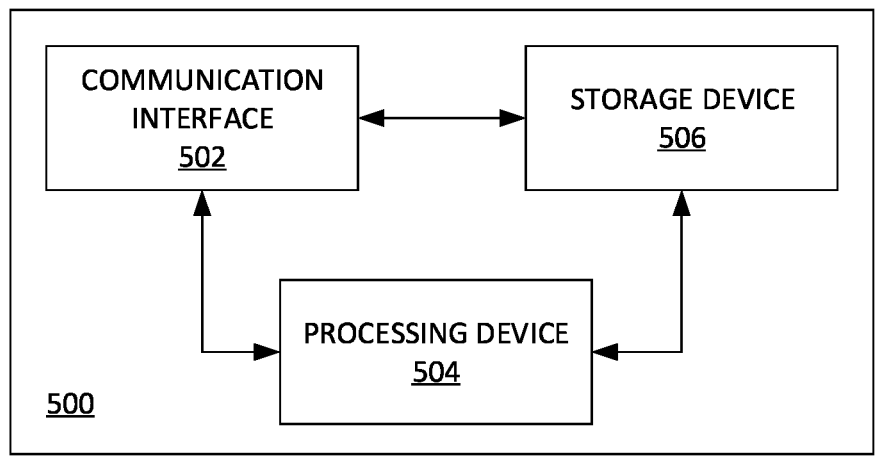
FIG. 5 is a block diagram of a device for facilitating managing cyber security health of a connected and autonomous vehicle (CAV), in accordance with some embodiments.
Figure 6:
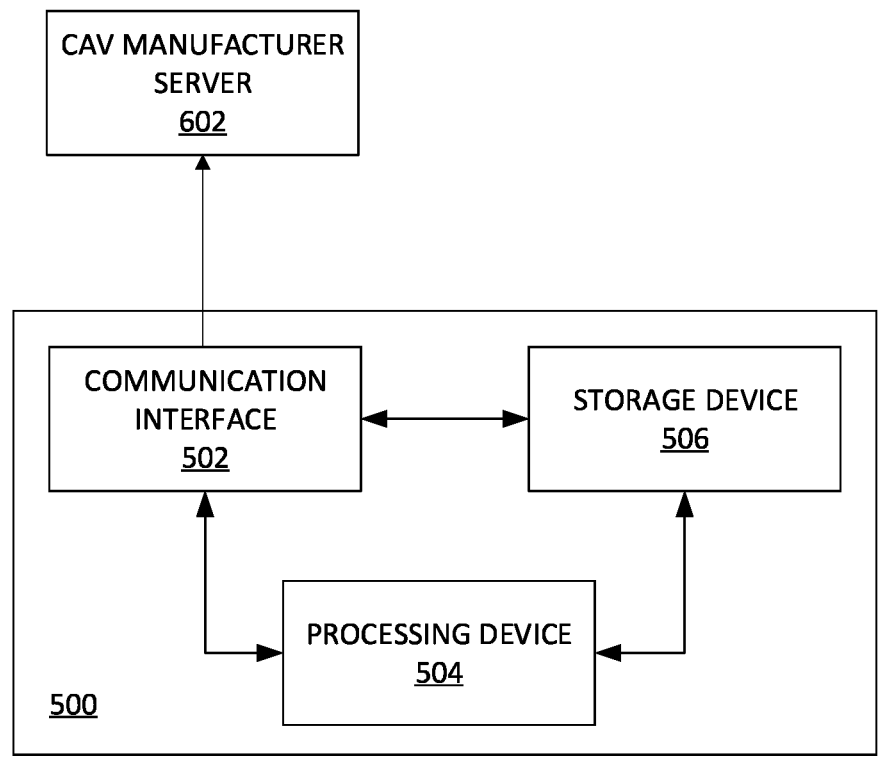
FIG. 6 is a block diagram of the device for facilitating managing the cyber security health of the connected and autonomous vehicle (CAV), in accordance with some embodiments.

FIG. 5 is a block diagram of a device 500 for facilitating managing cyber security health of a connected and autonomous vehicle (CAV), in accordance with some embodiments. Accordingly, the device 500 may include a communication interface 502 configured for transmitting a request for updating at least one electronic control unit (ECU) of a plurality of electronic control units (ECUs) associated with the CAV to a connected and autonomous vehicle (CAV) manufacturer server 602 (as shown in FIG. 6). Further, the communication interface 502 may be configured for receiving at least one of a security update and a security patch for the at least one ECU from the CAV manufacturer server 602 based on the transmitting of the request. Further, the communication interface 502 may be configured for receiving a report request from at least one input device. Further, the report request may include at least one user identifier associated with at least one user. Further, the communication interface 502 may be configured for transmitting a cyber security health status report to at least one output device. Further, the at least one output device may be configured for presenting the cyber security health status report.

Further, the device 500 may include a processing device 504 communicatively coupled with the communication interface 502. Further, the processing device 504 may be configured for applying at least one of the security update and the security patch to the at least one ECU for updating the at least one ECU based on the receiving. Further, the processing device 504 may be configured for determining an update status for each ECU of the plurality of ECUs based on the applying. Further, the processing device 504 may be configured for generating the cyber security health status report of the CAV based on the determining. Further, the processing device 504 may be configured for identifying the at least one user based on the at least one user identifier. Further, the processing device 504 may be configured for authenticating the at least one user based on the identifying of the at least one user. Further, the transmitting of the cyber security health status report may be based on the authenticating.

Further, the device 500 may include a storage device 506 communicatively coupled with the processing device 504. Further, the storage device 506 may be configured for storing the cyber security health status report.

Further, in some embodiments, the processing device 504 may be configured for generating a record of an application of at least one of the security update and the security patch to the at least one ECU of the plurality of ECUs based on the applying. Further, the storage device 506 may be configured for storing the record.

Further, in some embodiments, the storage device 506 may be configured for retrieving a last record of an application of at least one of a last security update and a last security patch to the each ECU of the plurality of ECUs prior to the application of at least one of the security update and the security patch to the at least one ECU. Further, the processing device 504 may be configured for comparing the last record with the record based on the retrieving. Further, the determining of the update status of the each ECU may be based on the comparing.

FIG. 6 is a block diagram of the device 500 for facilitating managing the cyber security health of the connected and autonomous vehicle (CAV), in accordance with some embodiments.

Figure 7:
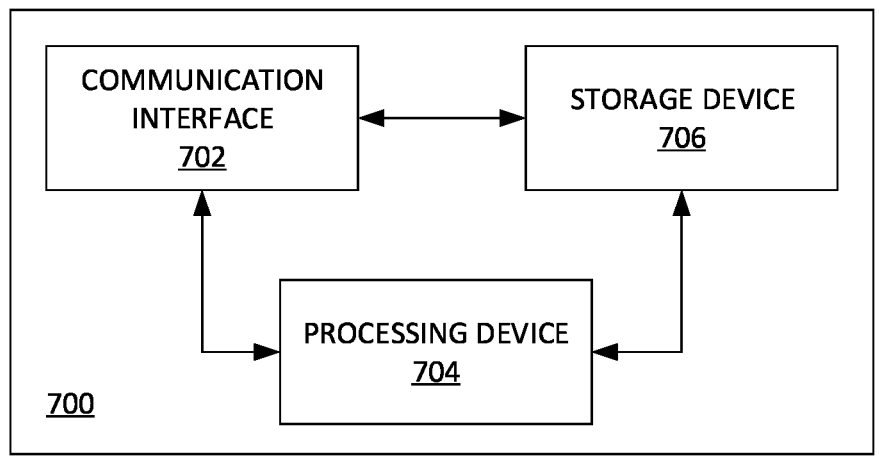
FIG. 7 is a block diagram of a device for facilitating managing cyber security health of a connected and autonomous vehicle (CAV), in accordance with some embodiments.
Figure 8:
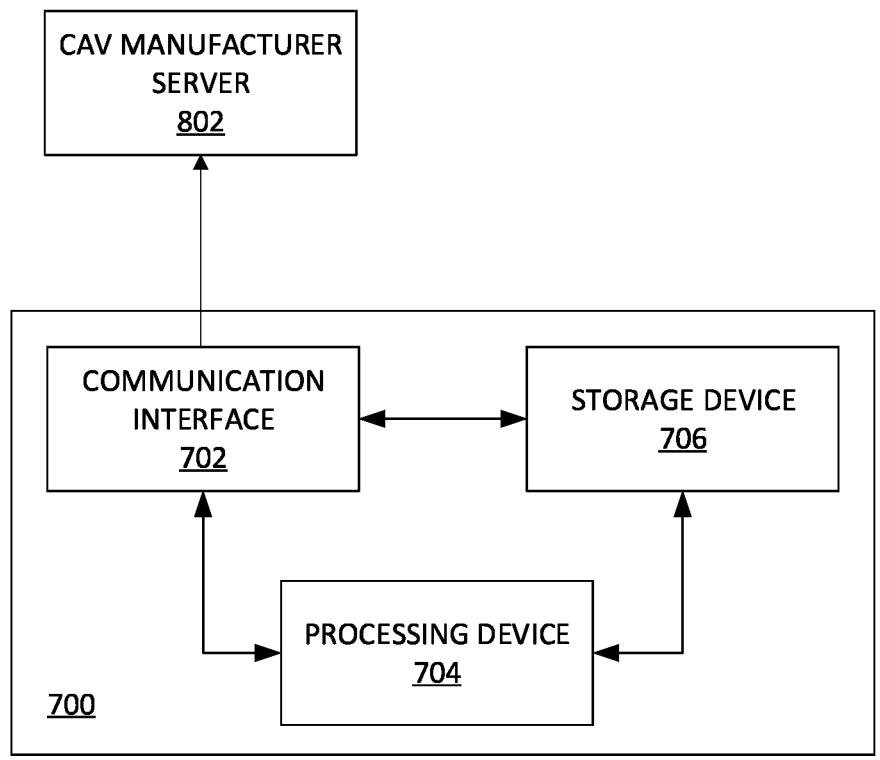
FIG. 8 is a block diagram of the device for facilitating managing the cyber security health of the connected and autonomous vehicle (CAV), in accordance with some embodiments.

FIG. 7 is a block diagram of a device 700 for facilitating managing cyber security health of a connected and autonomous vehicle (CAV), in accordance with some embodiments. Accordingly, the device 700 may include a communication interface 702 configured for receiving an updating request for updating at least one electronic control unit (ECU) of a plurality of electronic control units (ECUs) associated with the CAV from at least one user device. Further, the updating request may include at least one user identifier associated with at least one user. Further, the updating request may include at least one electronic control unit (ECU) identifier associated with the at least one ECU. Further, the communication interface 702 may be configured for transmitting a request for the updating of the at least one electronic control unit (ECU) of the plurality of electronic control units (ECUs) associated with the CAV to a connected and autonomous vehicle (CAV) manufacturer server 802 (as shown in FIG. 8). Further, the communication interface 702 may be configured for receiving at least one of a security update and a security patch for the at least one ECU from the CAV manufacturer server 802 based on the transmitting of the request.

Further, the device 700 may include a processing device 704 communicatively coupled with the communication interface 702. Further, the processing device 704 may be configured for identifying the at least one user based on the at least one user identifier. Further, the processing device 704 may be configured for authenticating the at least one user based on the identifying of the at least one user. Further, the processing device 704 may be configured for identifying the at least one ECU based on the at least one ECU identifier. Further, the processing device 704 may be configured for generating the request for the updating of at least one ECU based on the identifying of the at least one ECU and the authenticating. Further, the transmitting of the request for the updating of the at least one ECU may be based on the generating of the request. Further, the processing device 704 may be configured for applying at least one of the security update and the security patch to the at least one ECU for updating the at least one ECU based on the receiving and the authenticating. Further, the processing device 704 may be configured for determining an update status for each ECU of the plurality of ECUs based on the applying. Further, the processing device 704 may be configured for generating a cyber security health status report of the CAV based on the determining.

Further, the device 700 may include a storage device 706 communicatively coupled with the processing device 704. Further, the storage device 706 may be configured for storing the cyber security health status report.

FIG. 8 is a block diagram of the device 700 for facilitating managing the cyber security health of the connected and autonomous vehicle (CAV), in accordance with some embodiments.

Figure 9:
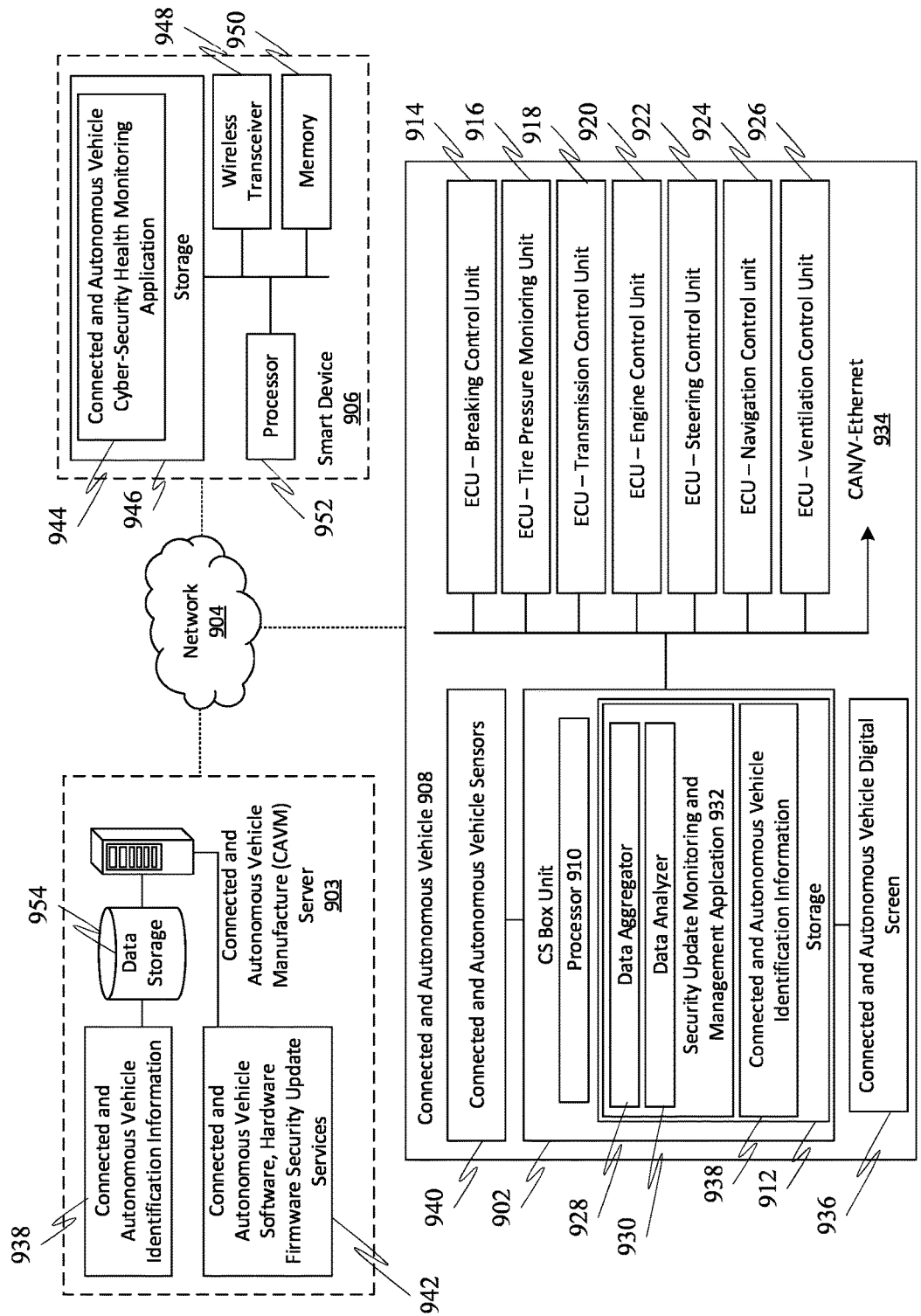
FIG. 9 is a schematic of a CAV cyber security health status update and notification system, in accordance with some embodiments.

FIG. 9 is a schematic of a CAV cyber security health status update and notification system 900, in accordance with some embodiments. Accordingly, the CAV cyber security health status update and notification system 900 may include an embedded unit called CSBox 902, that is in communication with a CAV manufacturer server (or CAVM server) 903 over a network 904 and a smart mobile 906 (or smart mobile device/smart device), configured to send security health status requests over the network 904 (or communication network). The network 904 that may be preferably the Internet includes a gateway that is able to send and receive data to and from the CSBox 902 to the CAVM server 903. The CSBox 902 receives CAV health status request from the user (who is either an owner or rider of a CAV 908) and provides a report that reveals the details about the cyber security health status of the CAV 908. The CSBox 902 is configured to receive and validate the request and generate security health status report on a digital screen 936 or the smart device 906. The CAV Manufacturer Server 903 includes a processor 910 and a database (or storage) 912 that stores vehicle identification information 938 and provides services for latest security updates and patches for a particular CAV (such as the CAV 908). The CAV Manufacturer Server 903 is also configured to communicate with the CSBox 902 for providing the updates and patches for particular ECUs for which updates are available.

Further, the CAV 908 with embedded intelligence may include various types of automobile, span buses or shuttles, Cross Utility Vehicles, taxis, air taxis, Trucks, Sport Utility Vehicles, Recreational Vehicles, Boa plane, Hybrid electric vehicles, tractors, and other vehicles utilized for farming and agriculture purposes. All these vehicles may vary in their capabilities such as towing, as well as cargo and passenger capacities.

Further, the CAV 908 includes a plurality of Electronic Control Units (ECUs) 914-926 configured to perform and manage different functions of the vehicle by using the vehicle battery. The plurality of ECUs 914-926 share physical hardware, software, and firmware (or CAV software, hardware firmware, security update services) 942 which needs to be updated periodically or on regular basis. The plurality of ECUs 914-926 are configured to receive security updates of software and firmware and other associated updates related to configuration settings, hardware, and software. Further, the plurality of ECUs 914-926 may include Braking Control ECU 914, configured to provide control for vehicle braking components while monitoring the speed sensors and wheels spinning all the time; Tire Pressure Monitoring ECU 916, configured to collect and diagnose the tire pressure status of the vehicle; Transmission Control ECU 918 also known as Gearbox Control ECU, configured to control automatic electronic transmissions for optimum performance and to ensure optimal fuel economy as well as smooth gear shifts; Engine Control ECU 920, configured to control engine management system, air management, fuel supply, fuel injection and ignition; Steering Control ECU 922, configured to control electro-mechanical power steering while utilizing steering wheel torque sensor, steering wheel position sensor and wheel speed sensor; Navigation Control ECU 924, configured to control the navigation services and navigation display; Ventilation Control ECU 926, configured to control, air flow, heating wires of the vehicle seats and the amount of air from ventilated seats. Further, the plurality of ECUs 914-926 may be interconnected via CAN/V-ethernet 934.

The CSBox 902 includes various types of components including Processor 910, and security update Monitoring and Management application (or Monitoring and Management application) 932 on the storage 912 of CSBox 902 so as to facilitate the performance of CSBox functions. Further, the Monitoring and Management application 932 may keep the record of all installed security updates with time stamps and will also periodically request the CAV manufacturer server 903 for any available newly released security updates and patches or vice versa. Further, the CSBox 902 is comprised of two major modules called a data aggregator 928 and a data analyzer 930. The data aggregator 928 aggregates the information from all ECUs 914-926 and forwards it to the data analyzer 930 (or Data Analyzer module). The data analyzer 930 sends the request to the CAV manufacturer server 903 to check for available updates or vice versa. After receiving the report from the CAV manufacturer server 903, the data analyzer 930 then analyzes and compares the information collected by the data aggregator 928 and information received from the CAV manufacturer server 903 regarding the latest updates and patches. The CSBox 902 generates a security health status report about the CAV 908 by informing the consumer in the form of prompts related to the firmware that is completely (fully) updated and alerts or warnings regarding the firmware that require further updates. This all information is displayed on the digital screen (or CAV digital screen) 936 mounted on the dashboard of the CAV 908 or the smart mobile device 906.

The CSBox (or CSBox unit) 902 includes one or more processors (such as the processor 910), configured to execute computer-readable instructions which are stored and maintained on a storage medium. A variety of high-level programming languages/technologies including C, C++, Java, JavaScript, Python, Perl, Visual Basic, Pascal, PL/SQL, etc., are used for developing computer programs from which computer-readable instructions are compiled and interpreted. The security update Monitoring and Management Application (or application) 932 automates the collection, analysis, and delivery of patches to ensure the remediation of known vulnerabilities. It includes tools for the proactive monitoring of the software, firmware, and hardware security updates. Further, the application 932 looks for and maintains up-to-date knowledge of the available security updates and patches. It also includes instructions that are executed to detect missing updates and to ensure that security updates or patches are correctly installed and that there are no failed security patches. The CSBox Unit 902 is connected to the digital screen 936 on the dashboard of the CAV 908. By utilizing the intuitive dashboard of the CAV 908, the owner of the vehicle may send the cybersecurity health status request, receive notifications and alerts if security patches are not updated, and check the report sent by the CAV Manufacturer server 903 regarding the cyber security health status of the vehicle and then finally monitor and update newly released or available software, hardware and firmware security patches (or updates) if required. The cyber security health status of the CAV 908 can be displayed using different colors including green representing the fully updated security patches and secured CAV 908, and red indicating that the CAV 908 is not secure and requires security updates. Thus, an overall cyber security picture of the CAV 908 is visible to the owner or passenger.

The CSBox unit 902 may be connected with one or more autonomous driving sensors (or CAV sensors) 940 configured to provide input to the security Monitoring and Management application 932. They may be either connected to the in-vehicle network or directly to the CSBox 902 without the use of an in-vehicle network bus. The one or more autonomous driving vehicle sensors 940 include various connectivity modules to facilitate the communication between the CSBox 902 and the CAV manufacturer server 903 through the Over-the-Air (OTA) technology which is utilized for remotely updating the security firmware and security patches.

The CAV identification information 938 includes information such as Vehicle Identification Number (VIN), configured to identify the vehicle. When the CAVM server 903 receives a request for security health of the CAV 908, it also includes vehicle identification information 938 so that the CAV manufacturer server 903 may query the database 912 for the last installed security updates and patches of that vehicle and check for the latest available security patches for that particular model of the vehicle.

Further, the smart device 906 may be associated with CAV cybersecurity health monitoring application 944. Further, the smart device 906 may include a storage 946. Further, the smart device 906 may include a wireless transceiver 948. Further, the smart device 906 may include a memory 950. Further, the smart device 906 may include a processor 952. Further, the CAVM server 903 may be communicatively coupled to a data storage 954.

Figure 10:
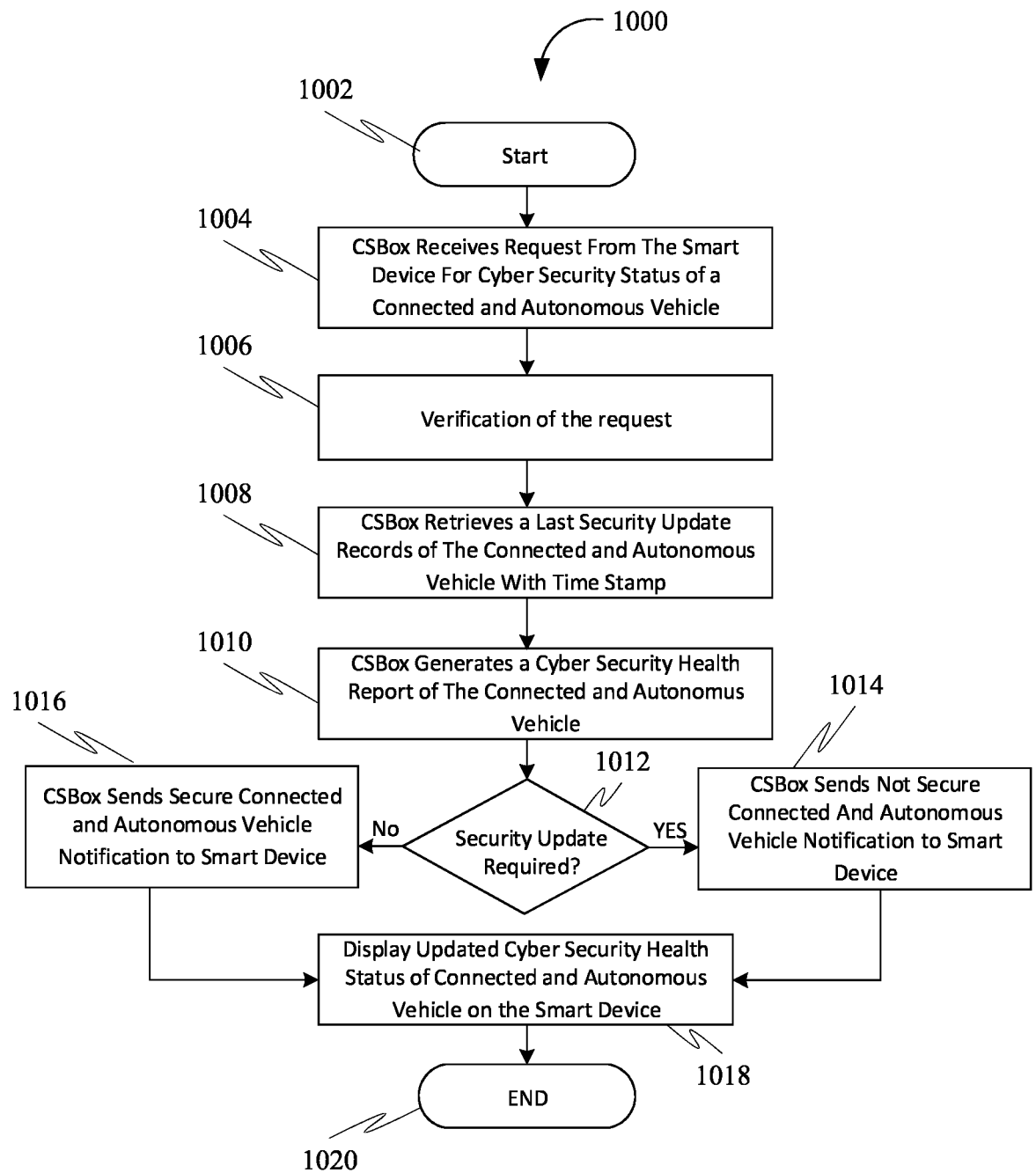
FIG. 10 is a flow diagram of a method for requesting a security status of the CAV by a rider through a mobile application, in accordance with some embodiments.

FIG. 10 is a flow diagram of a method 1000 for requesting a security status of the CAV by a rider through a mobile application, in accordance with some embodiments. Accordingly, the method 1000 may facilitate checking for cyber security health status of the CAV and to check whether the vehicle is secured and protected from the cyber-attacks or not. Further, at 1002, the method 1000 may include starting a process. Further, at 1004, the method 1000 may include the CSBox receiving a request from a smart mobile device. Further, at 1006, the method 1000 may include verification of the request. Further, at 1008, the method 1000 may include the CSBox retrieving a last security and firmware update records of the CAV with a time stamp from a database. After retrieving the last security and firmware update, at 1010, the method 1000 may include generating a cyber security health status report (or cyber security health report) of the CAV. Further, at 1012, the method 1000 may include checking if a security update is required by the CAV using the CSBox. Further, the CSBox checks whether the CAV (or hiring CAV) is secured or not. If all the ECUs are updated, the CSBox may inform the rider that the hiring CAV is secure with all updated security patches by sending and displaying a notification on the smart device. Further, at 1014, the method 1000 may include sending "not secure CAV" notification to the smart device. Further, at 1016, the method 1000 may include sending a "secure CAV" notification to the smart device. Further, at 1018, the method 1000 may include displaying an updated cyber security health report of the CAV on the smart device. Further, at 1020, the method 1000 may include an end.

Figure 11:
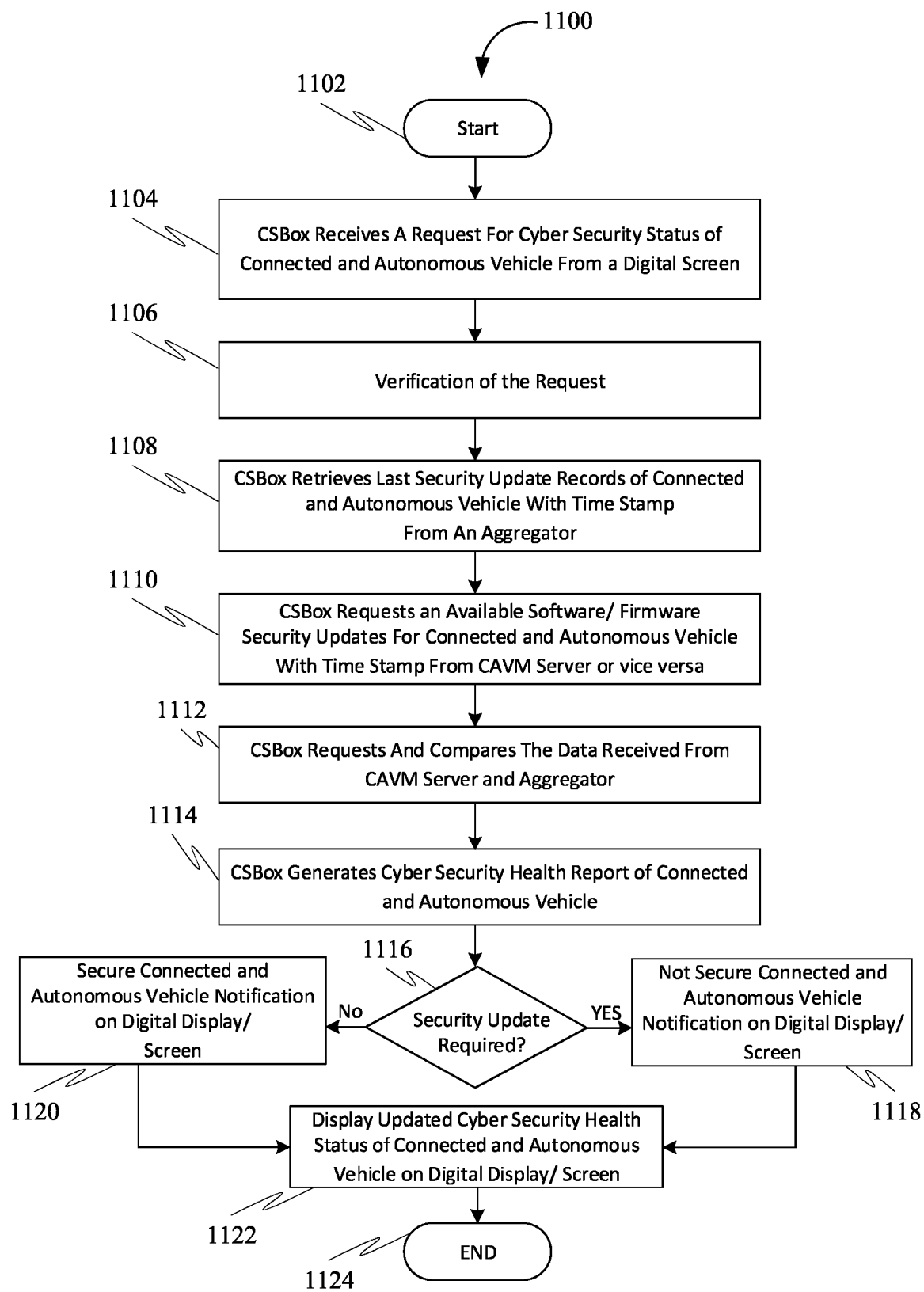
FIG. 11 is a flow diagram of a method for requesting a security status of a CAV by an owner through a digital screen mounted on the CAV, in accordance with some embodiments.

FIG. 11 is a flow diagram of a method 1100 for requesting a security status of a CAV by an owner through a digital screen mounted on the CAV, in accordance with some embodiments. Accordingly, the method 1100 may facilitate checking for cyber security health status of the CAV. Further, the method 1100 may facilitate checking whether the vehicle is secured and protected from cyber-attacks or not. Further, at 1102, the method 1100 may include a start. Further, at 1104, the method 1100 may include a CSBox receiving a request for cyber security status of the CAV from a dashboard of the CAV or a digital screen. Further, at 1106, the method 1100 may include validation or verification of the request. Further, at 1108, the method 1100 may include the CSBox retrieving a last security and firmware update records (or last security update records) of the CAV with a timestamp from at least one of the database or an aggregator. After retrieving, at 1110, the method 1100 may include the CSBox requesting an available software/firmware security update for the CAV with the time stamp from a CAVM server or vice versa. Further, the CSBox generates a cyber security health status report of the CAV. Further, the CSBox checks whether the CAV is secured or not. Further, at 1112, the method 1100 may include the CSBox comparing data (such as the last security update records and the available software/firmware security update) received from the CAVM server and the aggregator. Further, the CSBox analyzes and compares the latest records with the newly available security patches (if any) with the timestamps. Further, at 1114, the method 1100 may include the CSBox generating a complete cyber security health report of the CAV with complete information of the ECUs and their security patches or updates. Further, at 1116, the method 1100 may include checking if security update is required. Further, at 1118, the method 1100 may include displaying "not secure connected" and autonomous vehicle notification on the digital screen. Further, at 1120, the method 1100 may include displaying "secure connected" and autonomous vehicle notification on the digital screen. Further, at 1122, the method 1100 may include displaying an updated cyber security health status of the CAV on the digital screen. Further, at 1124, the method 1100 may include an end. If all the ECUs are updated, the CSBox may inform the owner of a CAV that the CAV is secure with all updated security patches by sending and displaying a notification on the dashboard of the CAV. Further, a detailed cyber security health report is also displayed on the dashboard of the CAV. Moreover, in case of any critical situation when critical ECUs are not updated or remain un-patched, then the CSBoX may not allow the owner of the CAV to operate it as the input of one ECU may affect the output of other ECU.

Figure 12:
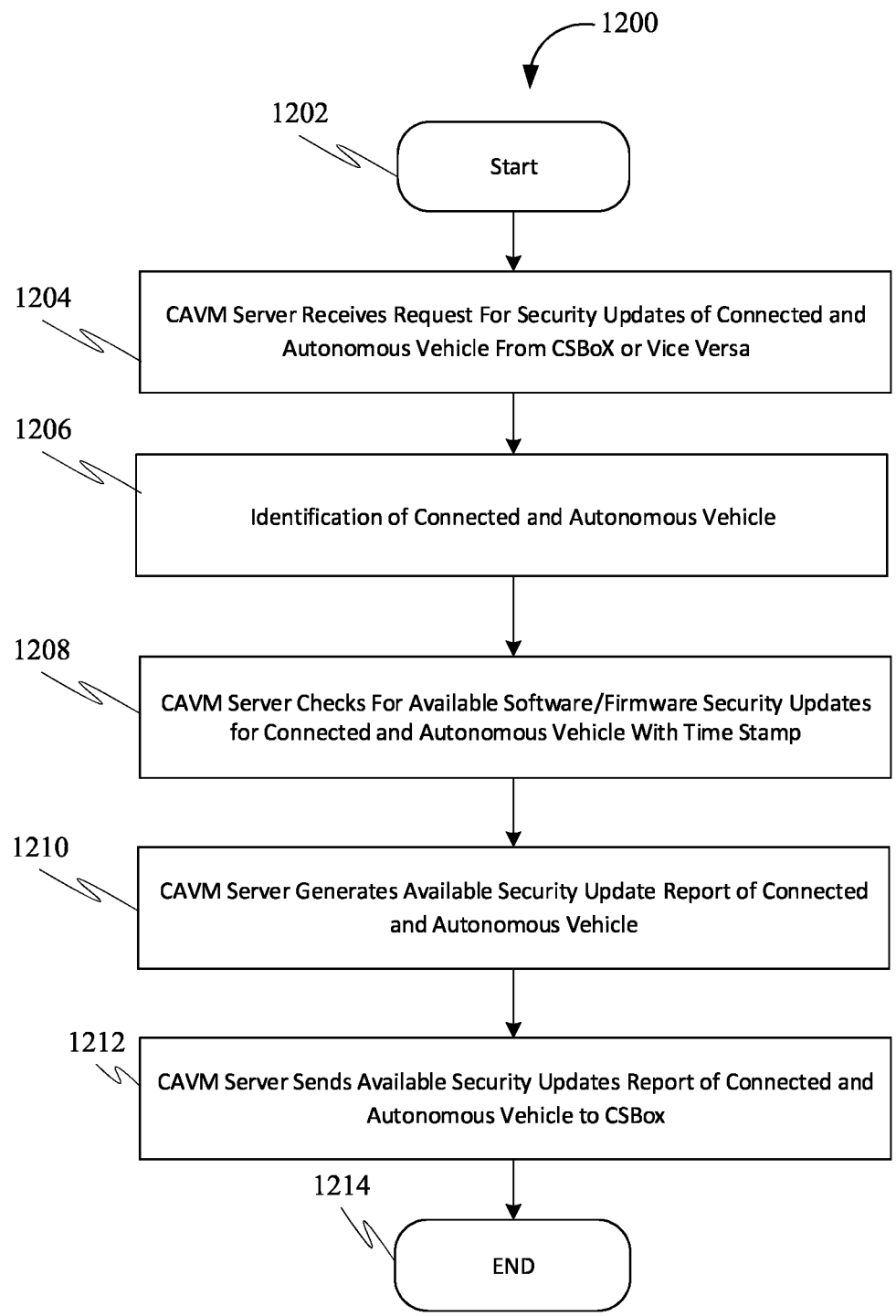
FIG. 12 is a flowchart of a method for requesting available security updates of CAV by the owner using a CSBox, in accordance with some embodiments.

FIG. 12 is a flowchart of a method 1200 for requesting available security updates of CAV by the owner using a CSBox, in accordance with some embodiments. Accordingly, at 1202, the method 1200 may include a start. Further, the CSBox then sends a request to a CAV manufacturer server for checking available updates and patches (or the available security updates and patches). Further, at 1204, the method 1200 may include the CAVM server receiving the request for security updates of the CAV from the CSBox or vice versa. Further, at 1206, the method 1200 may include the CAV manufacturer server verifying the identification of the CAV (or requesting CAV). Further, at 1208, the method 1200 may include the CAVM server checking for the available updates and patches (or available software/firmware security updates) for the CAV with a timestamp. Further, at 1210, the method 1200 may include the CAV manufacturer server generating a complete report (or report) about the cyber security health status of the CAV. Further, at 1212, the method 1200 may include the CAVM server sending the report regarding the available updates and patches to the CSBox. Further, at 1214, the method 1200 may include an end.

Figure 13:
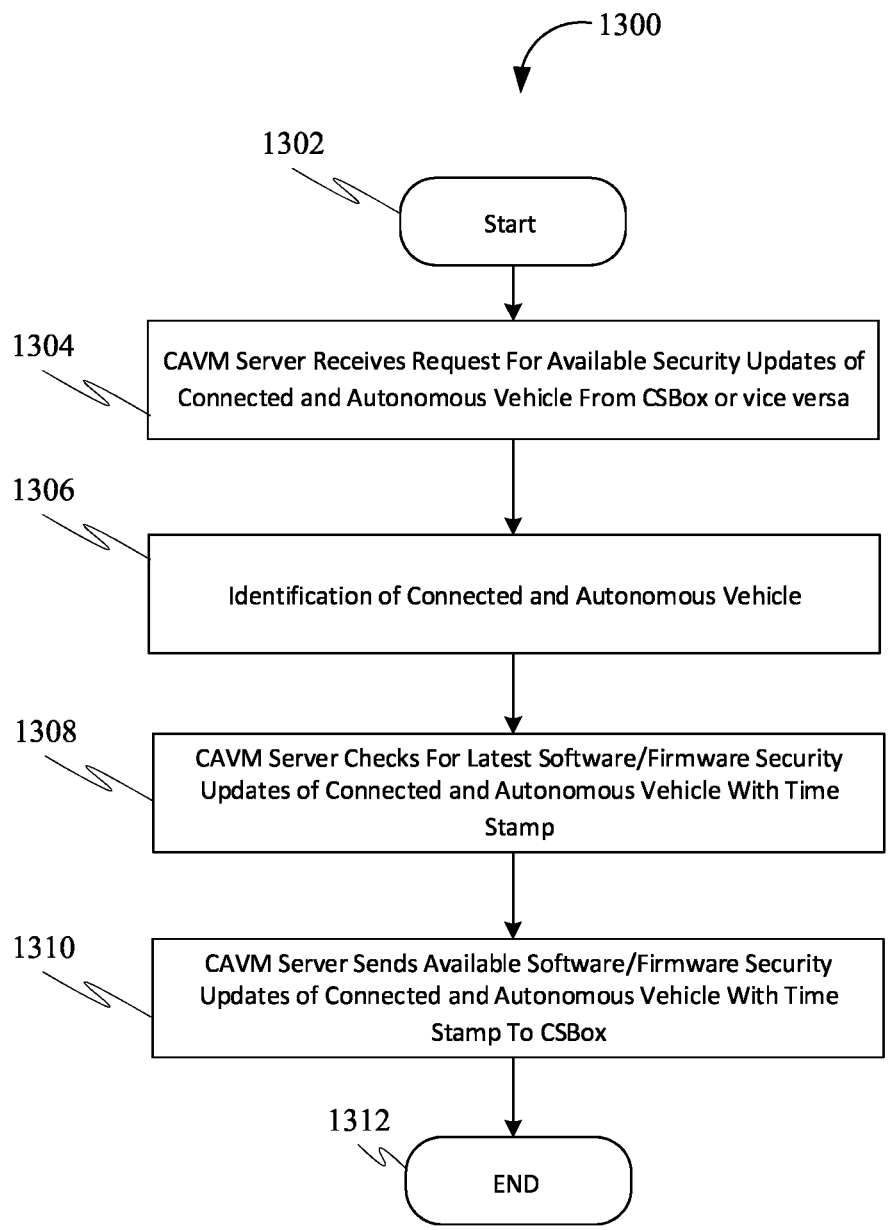
FIG. 13 is a flowchart of a method for downloading available security updates of the CAV from a CAV manufacturer server using a CSBox, in accordance with some embodiments.

FIG. 13 is a flowchart of a method 1300 for downloading available security updates of the CAV from a CAV manufacturer server using a CSBox, in accordance with some embodiments. Accordingly, at 1302, the method 1300 may include a start. Further, the CSBox sends a request to the CAV manufacturer server for sending and downloading newly released updates and patches (or the available security updates). Further, at 1304, the method 1300 may include the CAVM server receiving the request for available security updates of the CAV from the CSBox. Further, at 1306, the method 1300 may include the CAV manufacturer server verifying the identification of the CAV. Further, at 1308, the method 1300 may include the CAVM server checking for latest firmware/software security updates and patches (or the available security updates) with a timestamp for particular ECUs of the CAV. Further, at 1310, the method 1300 may include the CAVM server sending the available security updates (or available software/firmware security updates and patches) of the CAV with the timestamp to the CSBox. Further, at 1312, the method 1300 may include an end.

Figure 14:
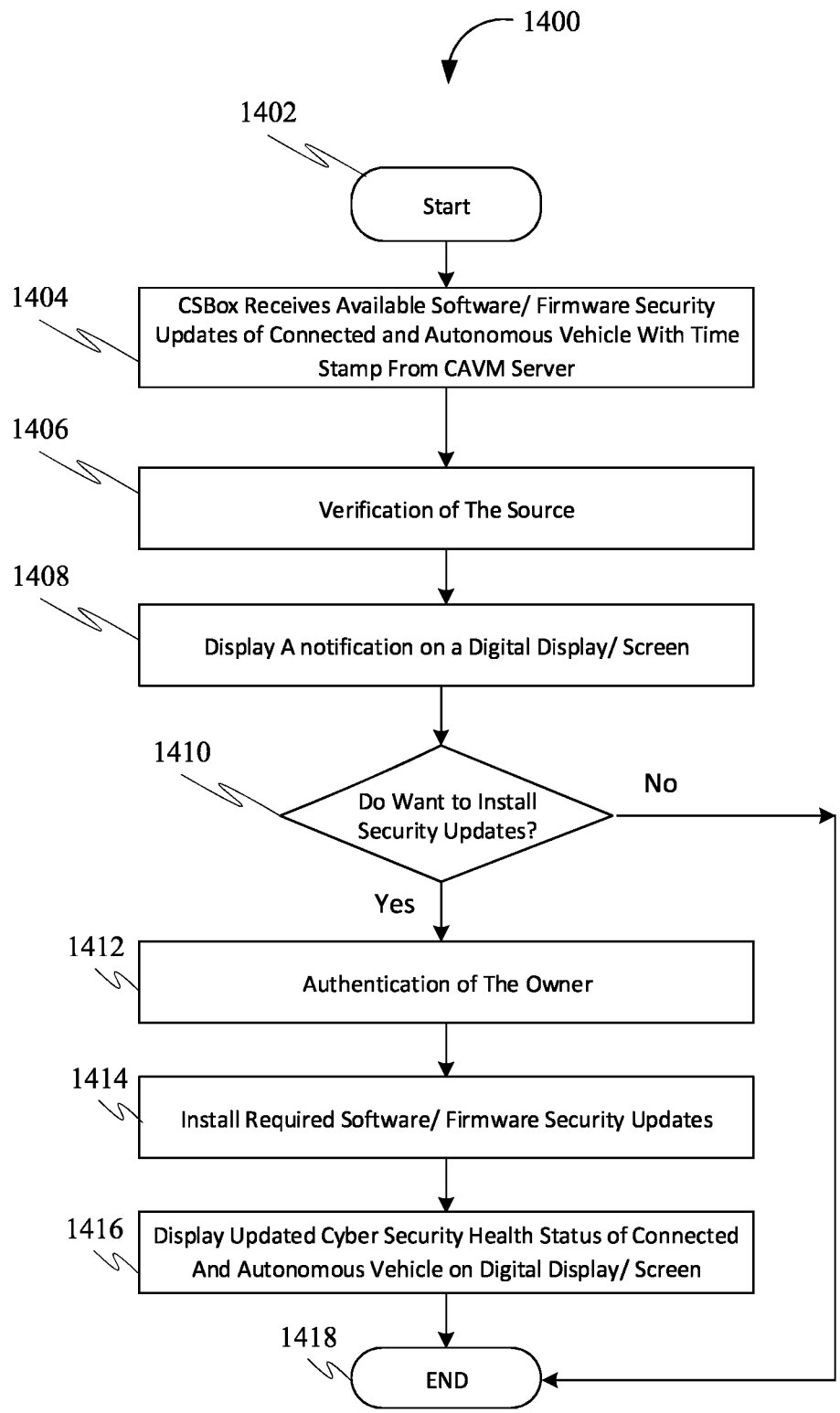
FIG. 14 is a flow diagram of a method for installing available security updates and patches of a CAV using a CSBox, in accordance with some embodiments.

FIG. 14 is a flow diagram of a method 1400 for installing available security updates and patches of a CAV using a CSBox, in accordance with some embodiments. Accordingly, at 1402, the method 1400 may include a start. Further, at 1404, the method 1400 may include the CSBox receiving available software/firmware security updates (or newly released updates and patches) of the CAV with a time stamp from the CAV manufacturer server. Further, at 1406, the method 1400 may include the CSBox verifying a source. Further, at 1408, the method 1400 may include displaying a notification for the owner of the CAV on a digital screen/display for installing the newly released updates and patches. Further, at 1410, the method 1400 may include checking if the owner wants to install the newly released updates and patches. Further, if the owner of the CAV wants to install the newly released updates and patches, at 1412, the method 1400 may include the CSBox authenticating the owner. Further, at 1414, the method 1400 may include installing required security updates (such as the newly released updates). Further, at 1416, the method 1400 may include the CSBox displaying an updated cyber security health status of the CAV on the digital screen. Further, at 1418, the method 1400 may include an end. Further, if the owner of the CAV doesn't want to install the newly released updates, after 1410, the method 1400 may proceed to 1418.

In further embodiments, a device for facilitating notifying and updating a cyber security health status of a CAV is disclosed. Accordingly, the device may include a cyber security box (CSBox) located in a CAV and configured to send a request to a CAV manufacturer server for checking the available security updates of a CAV. Further, the device may be configured for receiving software and firmware security updates and patches from the CAV manufacturer server. Further, the device may be configured for downloading the software and firmware security updates and patches. Further, the device may be configured for installing the software and firmware security updates and patches. Further, the device may be configured for sending a complete health status report (or report) of the CAV with updated ECUs and the ECUs which require further security patches. Further, the device may be configured for displaying the complete cyber security health status report on an intuitive dashboard of the CAV for the owner or on a smart mobile device and for the rider on the smart mobile device.

Further, in some embodiments, the CSBox may include two major modules comprising a data aggregator and a data analyzer. The data aggregator may aggregate information from all ECUs and forward it to the data analyzer module. The data analyzer may request the CAV manufacturer server to check for available updates. The data analyzer analyzes and compares the information collected by the data aggregator and information received from the CAV manufacturer server. Further, the CSBox generates security health status report about the requested CAV by informing the consumer in the form of prompts related to a firmware that are completely (fully) updated and alerts or warnings regarding the firmware which require further updating on the digital screen mounted on the dashboard of a CAV or the smart mobile device.

Further, in some embodiments, the CSBox may be coupled to a plurality of ECUs through an in-vehicle network and collect information about the security updates of the ECUs and analyze the information to decide which ECUs require security patches.

Further, in some embodiments, the CSBox may be coupled with the digital screen mounted on the dashboard of the CAV.

Further, in some embodiments, the CSBox may be connected to driving connectivity sensors and utilizes Over-The-Air (OTA) technology to remotely update the software and firmware patches.

Further, in some embodiments, the CSBox includes a security monitoring and management application that looks for and maintains an up-to-date knowledge of the available security updates and patches.

Further, in some embodiments, the report generated by the CSBox includes prompts related to firmwares that are fully updated and alerts or warnings regarding the firmwares which require further updating and security patches.

In further embodiments, the device may be communicatively coupled to a CAV manufacturer server (or CAVM server) configured to receive a request from the CSBox of the CAV over a network. Further, the CAVM server may be configured for validating the identification of a requesting CAV. Further, the CAVM server may be configured for checking and retrieving the newly released security updates and patches record from the database. Further, the CAVM server may be configured for sending newly released security updates and patches to the CSBox for installation.

Further, in some embodiments, the CAVM server includes a component that retrieves vehicle identification from the database, and available software, hardware firmware security updates and generates a security health status report.

Further, in some embodiments, the CAVM server may be associated with an application to provide services to monitor and manage the software and hardware firmware security updates and patches.

In further embodiments, the device may be communicatively coupled to the smart mobile device configured to send a request for cyber security health status report to the CSBox of the CAV. Further, the smart mobile device may be configured for receiving the cyber-security health report of the CAV from the CSBox of the CAV.

Further, in some embodiments, the smart mobile device retrieves the cyber security health status report from the CSBoX when the owner or rider of a CAV requests for health status report of his CAV.

Further, in some embodiments, the smart mobile device authenticates the owner of the CAV and then installs the security updates and patches using CSBox when the owner of the CAV requests for installing the security updates for his CAV.

Figure 15:
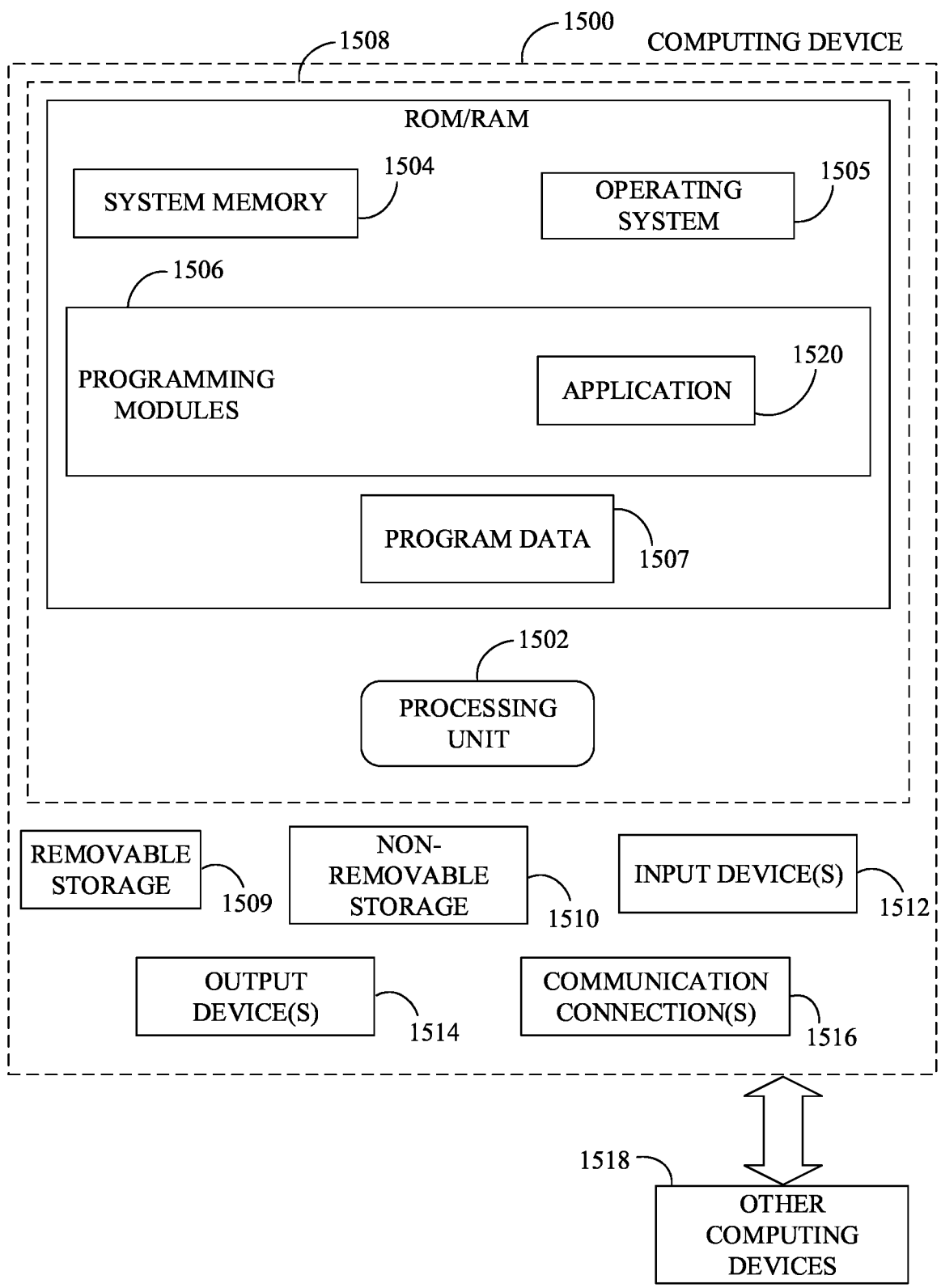
FIG. 15 is a block diagram of a computing device for implementing the methods disclosed herein, in accordance with some embodiments.

With reference to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g. random-access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include image-processing module, machine learning module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and non-volatile, removable and non-removable media implemented in any method or technology for storage of information, such as computer-readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, a location sensor, a camera, a biometric sensor, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., application 1520) may perform processes including, for example, one or more stages of methods, algorithms, systems, applications, servers, databases as described above. The aforementioned process is an example, and processing unit 1502 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A device for facilitating managing cyber security health of a connected and autonomous vehicle (CAV), the device comprising:
a communication interface configured for:
transmitting a request for updating at least one electronic control unit (ECU) of a plurality of electronic control units (ECUs) associated with the CAV to a connected and autonomous vehicle (CAV) manufacturer server; and
receiving at least one of a security update and a security patch for the at least one ECU from the CAV manufacturer server based on the transmitting of the request;
a processing device communicatively coupled with the communication interface, wherein the processing device is configured for:
applying at least one of the security update and the security patch to the at least one ECU for updating the at least one ECU based on the receiving;
determining an update status for each ECU of the plurality of ECUs based on the applying; and
generating a cyber security health status report of the CAV based on the determining, wherein the plurality of ECUs share physical hardware, software, and firmware of the CAV that needs to be updated periodically or on regular basis, wherein the cyber security health status report comprises at least one prompt associated with at least one first ECU of the plurality of ECUs, wherein the at least one prompt indicates a fully updated status of the update status, wherein the cyber security health status report comprises at least one alert associated with at least one second ECU of the plurality of ECUs, wherein the at least one alert indicates an update requiring status of the update status, wherein the at least one prompt is related to the firmware associated with the at least one first ECU that is fully updated, wherein the at least one alert is related to the hardware associated with the at least one second ECU that requires further updating;
a digital screen mounted on the CAV, wherein the digital screen is coupled with the processing device, wherein the digital screen is configured for displaying the at least one prompt and the at least one alert; and
a storage device communicatively coupled with the processing device, wherein the storage device is configured for storing the cyber security health status report.

2. The device of claim 1, wherein the processing device is further configured for generating a record of an application of at least one of the security update and the security patch to the at least one ECU of the plurality of ECUs based on the applying, wherein the storage device is further configured for storing the record.

3. The device of claim 2, wherein the storage device is further configured for retrieving a last record of an application of at least one of a last security update and a last security patch to the each ECU of the plurality of ECUs prior to the application of at least one of the security update and the security patch to the at least one ECU, wherein the processing device is further configured for comparing the last record with the record based on the retrieving, wherein the determining of the update status of the each ECU is further based on the comparing.

4. The device of claim 1, wherein the communication interface is further configured for:
receiving update and patch information of at least one of an available security update and an available security patch associated with the at least one ECU from the CAV manufacturer server based on the transmitting of the request; and
receiving at least one electronic control unit (ECU) information associated with the at least one ECU from the at least one ECU, wherein the processing device is further configured for comparing the update and patch information with the at least one ECU information, wherein the determining of the update status of the at least one ECU is further based on the comparing.

5. The device of claim 1, wherein the communication interface is further configured for receiving a plurality of electronic control unit (ECU) information associated with the plurality of ECUs from the plurality of ECUs, wherein the processing device is further configured for:
analyzing the plurality of ECU information;
identifying the at least one ECU requiring the updating based on the analyzing of the plurality of ECU information; and
generating the request for the updating of the at least one ECU based on the identifying, wherein the transmitting of the request is based on the generating of the request.

6. The device of claim 5, wherein the processing device is further configured for determining at least one of the security update and the security patch required by the at least one ECU based on the analyzing of the plurality of ECU information, wherein the generating of the request is further based on the determining of at least one of the security update and the security patch required by the at least one ECU.

7. The device of claim 1, wherein the communication interface is further configured for:
receiving a report request from at least one input device, wherein the report request comprises at least one user identifier associated with at least one user; and
transmitting the cyber security health status report to at least one output device, wherein the at least one output device is configured for presenting the cyber security health status report, wherein the processing device is further configured for:
identifying the at least one user based on the at least one user identifier; and
authenticating the at least one user based on the identifying of the at least one user, wherein the transmitting of the cyber security health status report is based on the authenticating.

8. The device of claim 1, wherein the communication interface is further configured for receiving an updating request for the updating of the at least one ECU from at least one user device, wherein the updating request comprises at least one user identifier associated with at least one user, wherein the processing device is further configured for:
identifying the at least one user based on the at least one user identifier; and
authenticating the at least one user based on the identifying of the at least one user, wherein the applying of at least one of the security update and the security patch to the at least one ECU is further based on the authenticating.

9. The device of claim 8, wherein the updating request further comprises at least one electronic control unit (ECU) identifier associated with the at least one ECU, wherein the processing device is further configured for:
identifying the at least one ECU based on the at least one ECU identifier; and
generating the request for the updating of at least one ECU based on the identifying of the at least one ECU and the authenticating, wherein the transmitting of the request for the updating of the at least one ECU is based on the generating of the request.

10. The device of claim 1, wherein the request comprises at least one vehicle identifier associated with the CAV, wherein the CAV manufacturer server comprises a server communication device configured for:
receiving the request from the communication interface of the device; and
transmitting at least one of the security update and the security patch to the communication interface of the CAV, wherein the CAV manufacturer server comprises a server processing device communicatively coupled with the server communication device, wherein the server processing device is configured for identifying the CAV based on the at least one vehicle identifier, wherein the CAV manufacturer server comprises a server storage device communicatively coupled with the server processing device, wherein the server storage device is configured for retrieving at least one of the security update and the security patch for the at least one ECU of the CAV based on the identifying of the CAV, wherein the transmitting of at least one of the security update and the security patch to the communication interface of the CAV is based on the retrieving.

11. The device of claim 10, wherein the server processing device is further configured for generating a server record of at least one of the security update and the security patch requested for the CAV based on the retrieving of at least one of the security update and the security patch, wherein the server storage device is further configured for storing the server record.

12. The device of claim 11, wherein the server storage device is further configured for retrieving a last server record of at least one a last security update and a last security patch requested for the CAV, wherein the server processing device is further configured for comparing the last server record with the server record based on the retrieving of the last server record, wherein the determining of the update status of the each ECU of the plurality of ECUs is further based on the comparing.

13. The device of claim 1, wherein the processing device is communicatively coupled with the plurality of ECUs, wherein the processing device is further configured for communicating with the plurality of ECUs using at least one of a wired communication channel and a wireless communication channel, wherein the applying of at least one of the security update and the security patch to the at least one ECU is further based on the communicating.

14. The device of claim 13, wherein the wired communication channel comprises at least one in-vehicle network of the CAV, wherein the communicating with the plurality of ECUs is further based on the at least one in-vehicle network.

15. The device of claim 1 further comprising at least one vehicle sensor communicatively coupled with the processing device, wherein the at least one vehicle sensor is configured for generating at least one vehicle sensor data based on an operation of the CAV, wherein the processing device is further configured for:
- analyzing the at least one vehicle sensor data;
- determining an abnormality associated with the operation of the CAV based on the analyzing of the at least one vehicle sensor data; and
- generating the request for the updating of the at least one ECU based on the determining of the abnormality, wherein the transmitting of the request is based on the generating of the request.

16. A device for facilitating managing cyber security health of a connected and autonomous vehicle (CAV), the device comprising:
- a communication interface configured for:
  - transmitting a request for updating at least one electronic control unit (ECU) of a plurality of electronic control units (ECUs) associated with the CAV to a connected and autonomous vehicle (CAV) manufacturer server;
  - receiving at least one of a security update and a security patch for the at least one ECU from the CAV manufacturer server based on the transmitting of the request;
  - receiving a report request from at least one input device, wherein the report request comprises at least one user identifier associated with at least one user; and
  - transmitting a cyber security health status report to at least one output device, wherein the at least one output device is configured for presenting the cyber security health status report;
- a processing device communicatively coupled with the communication interface, wherein the processing device is configured for:
  - applying at least one of the security update and the security patch to the at least one ECU for updating the at least one ECU based on the receiving;
  - determining an update status for each ECU of the plurality of ECUs based on the applying;
  - generating the cyber security health status report of the CAV based on the determining, wherein the plurality of ECUs share physical hardware, software, and firmware of the CAV that needs to be updated periodically or on regular basis, wherein the cyber security health status report comprises at least one prompt associated with at least one first ECU of the plurality of ECUs, wherein the at least one prompt indicates a fully updated status of the update status, wherein the cyber security health status report comprises at least one alert associated with at least one second ECU of the plurality of ECUs, wherein the at least one alert indicates an update requiring status of the update status, wherein the at least one prompt is related to the firmware associated with the at least one first ECU that is fully updated, wherein the at least one alert is related to the hardware associated with the at least one second ECU that requires further updating;
  - identifying the at least one user based on the at least one user identifier; and
  - authenticating the at least one user based on the identifying of the at least one user, wherein the transmitting of the cyber security health status report is based on the authenticating; and
- a storage device communicatively coupled with the processing device, wherein the storage device is configured for storing the cyber security health status report.

17. The device of claim 16, wherein the processing device is further configured for generating a record of an application of at least one of the security update and the security patch to the at least one ECU of the plurality of ECUs based on the applying, wherein the storage device is further configured for storing the record.

18. The device of claim 17, wherein the storage device is further configured for retrieving a last record of an application of at least one of a last security update and a last security patch to the each ECU of the plurality of ECUs prior to the application of at least one of the security update and the security patch to the at least one ECU, wherein the processing device is further configured for comparing the last record with the record based on the retrieving, wherein the determining of the update status of the each ECU is further based on the comparing.

19. A device for facilitating managing cyber security health of a connected and autonomous vehicle (CAV), the device comprising:
- a communication interface configured for:
  - receiving an updating request for updating at least one electronic control unit (ECU) of a plurality of electronic control units (ECUs) associated with the CAV from at least one user device, wherein the updating request comprises at least one user identifier associated with at least one user, wherein the updating request comprises at least one electronic control unit (ECU) identifier associated with the at least one ECU;
  - transmitting a request for the updating of the at least one electronic control unit (ECU) of the plurality of electronic control units (ECUs) associated with the CAV to a connected and autonomous vehicle (CAV) manufacturer server; and
  - receiving at least one of a security update and a security patch for the at least one ECU from the CAV manufacturer server based on the transmitting of the request;
- a processing device communicatively coupled with the communication interface, wherein the processing device is configured for:
  - identifying the at least one user based on the at least one user identifier;
  - authenticating the at least one user based on the identifying of the at least one user;
  - identifying the at least one ECU based on the at least one ECU identifier; and generating the request for the updating of at least one ECU based on the identifying of the at least one ECU and the authenticating, wherein the transmitting of the request for the updating of the at least one ECU is based on the generating of the request;

applying at least one of the security update and the security patch to the at least one ECU for updating the at least one ECU based on the receiving and the authenticating;

determining an update status for each ECU of the plurality of ECUs based on the applying; and generating a cyber security health status report of the CAV based on the determining, wherein the plurality of ECUs share physical hardware, software, and firmware of the CAV that needs to be updated periodically or on regular basis, wherein the cyber security health status report comprises at least one prompt associated with at least one first ECU of the plurality of ECUs, wherein the at least one prompt indicates a fully updated status of the update status, wherein the cyber security health status report comprises at least one alert associated with at least one second ECU of the plurality of ECUs, wherein the at least one alert indicates an update requiring status of the update status, wherein the at least one prompt is related to the firmware associated with the at least one first ECU that is fully updated, wherein the at least one alert is related to the hardware associated with the at least one second ECU that requires further updating; and a storage device communicatively coupled with the processing device, wherein the storage device is configured for storing the cyber security health status report.

* * * * *